(12) United States Patent
Fletcher et al.

(10) Patent No.: US 10,336,305 B2
(45) Date of Patent: *Jul. 2, 2019

(54) ASPIRATORS FOR PRODUCING VACUUM USING THE VENTURI EFFECT

(71) Applicants: Dave Fletcher, Flint, MI (US); Brian Graichen, Leonard, MI (US); Keith Hampton, Ann Arbor, MI (US); Matt Gilmer, Whitmore Lake, MI (US); Andrew Niedert, New Hudson, MI (US)

(72) Inventors: Dave Fletcher, Flint, MI (US); Brian Graichen, Leonard, MI (US); Keith Hampton, Ann Arbor, MI (US); Matt Gilmer, Whitmore Lake, MI (US); Andrew Niedert, New Hudson, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,561

(22) Filed: Oct. 24, 2017

(65) Prior Publication Data

US 2018/0043875 A1 Feb. 15, 2018

Related U.S. Application Data

(63) Continuation of application No. 14/294,727, filed on Jun. 3, 2014, now Pat. No. 9,827,963.

(Continued)

(51) Int. Cl.
*B01F 5/04* (2006.01)
*B60T 13/52* (2006.01)
*B60T 17/02* (2006.01)

(52) U.S. Cl.
CPC .............. *B60T 13/52* (2013.01); *B60T 17/02* (2013.01); *Y10T 137/87587* (2015.04)

(58) Field of Classification Search
CPC ... B60T 13/52; B60T 17/02; Y10T 137/87587
(Continued)

(56) References Cited

U.S. PATENT DOCUMENTS 1,845,969 A 2/1932 Hueber
3,234,932 A 2/1966 Bird et al.
(Continued)

FOREIGN PATENT DOCUMENTS

DE 4310761 10/1994
GB 2129516 5/1984
JP 2001-295800 10/2001

OTHER PUBLICATIONS

PCT, International Search Report and Written Opinion, PCT/US2014/041250 (dated Oct. 27, 2014).
(Continued)

*Primary Examiner* — Umashankar Venkatesan
(74) *Attorney, Agent, or Firm* — FisherBroyles, LLP; Susan M. Oiler

(57) ABSTRACT

A Venturi device for producing vacuum from fluids in an engine system has a body defining a Venturi gap separating apart an outlet end of a converging motive section and an inlet end of a diverging discharge section by a lineal distance, and a suction port in fluid communication with the Venturi gap. The converging motive section and the diverging discharge section both gradually, continuously taper toward the Venturi gap, the converging motive section defines a circular-shaped motive inlet and an elliptical- or polygonal-shaped motive outlet, the diverging discharge section defines an elliptical- or polygonal-shaped discharge inlet, and an inner passageway of the converging motive (Continued)

section transitions as a hyperbolic function from the motive inlet to the elliptical- or polygonal-shaped motive outlet.

16 Claims, 9 Drawing Sheets

Related U.S. Application Data

(60) Provisional application No. 61/833,746, filed on Jun. 11, 2013.

(58) Field of Classification Search
USPC .................. 137/891; 417/187, 188, 189
See application file for complete search history.

(56) References Cited

U.S. PATENT DOCUMENTS

| | | | |
|---|---|---|---|
| 3,754,841 A | 8/1973 | Grabb et al. | |
| 4,211,200 A | 7/1980 | Rocchio et al. | |
| 4,499,034 A | 2/1985 | McAllister | |
| 4,519,423 A | 5/1985 | Ho | |
| 4,554,786 A | 11/1985 | Takeuchi et al. | |
| 5,108,266 A | 4/1992 | Hewitt | |
| 5,188,141 A | 2/1993 | Cook et al. | |
| 5,291,916 A | 3/1994 | Kloosterman et al. | |
| 5,816,446 A | 10/1998 | Steindorf et al. | |
| 6,035,881 A | 3/2000 | Emmerich et al. | |
| RE37,090 E | 3/2001 | Kloosterman et al. | |
| 6,220,271 B1 | 4/2001 | Emmerich et al. | |
| 7,722,132 B2 | 5/2010 | Carlsson | |
| 2006/0016477 A1 | 1/2006 | Zaparackas | |
| 2008/0007113 A1 | 1/2008 | Choi | |
| 2008/0121480 A1 | 5/2008 | Kawamori et al. | |
| 2011/0132311 A1 | 6/2011 | Pursifull et al. | |
| 2011/0186151 A1 | 8/2011 | Sparazynski | |
| 2013/0213510 A1 | 8/2013 | Burnham et al. | |
| 2013/0233276 A1 | 9/2013 | Pursifull et al. | |
| 2013/0233287 A1 | 9/2013 | Leone | |

OTHER PUBLICATIONS

CN, Office Action and Search Report with English Translation; Chinese Patent application No. 201410413220.7 (dated Nov. 14, 2016).

EP, Supplementary European Search Report; Patent Application No. 14811266.7 (dated Apr. 5, 2017).

JP, Non-Final Office Action with English Translation; Japanese Application No. 2016-519556 (dated May 18, 2018).

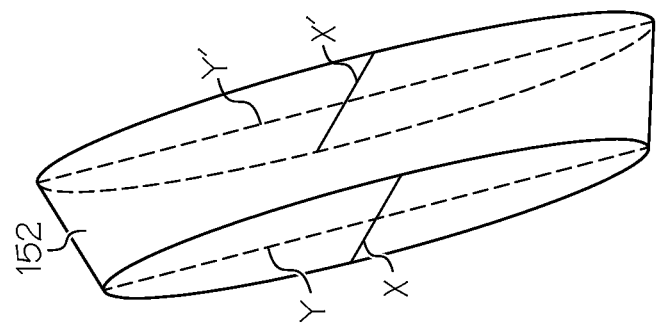
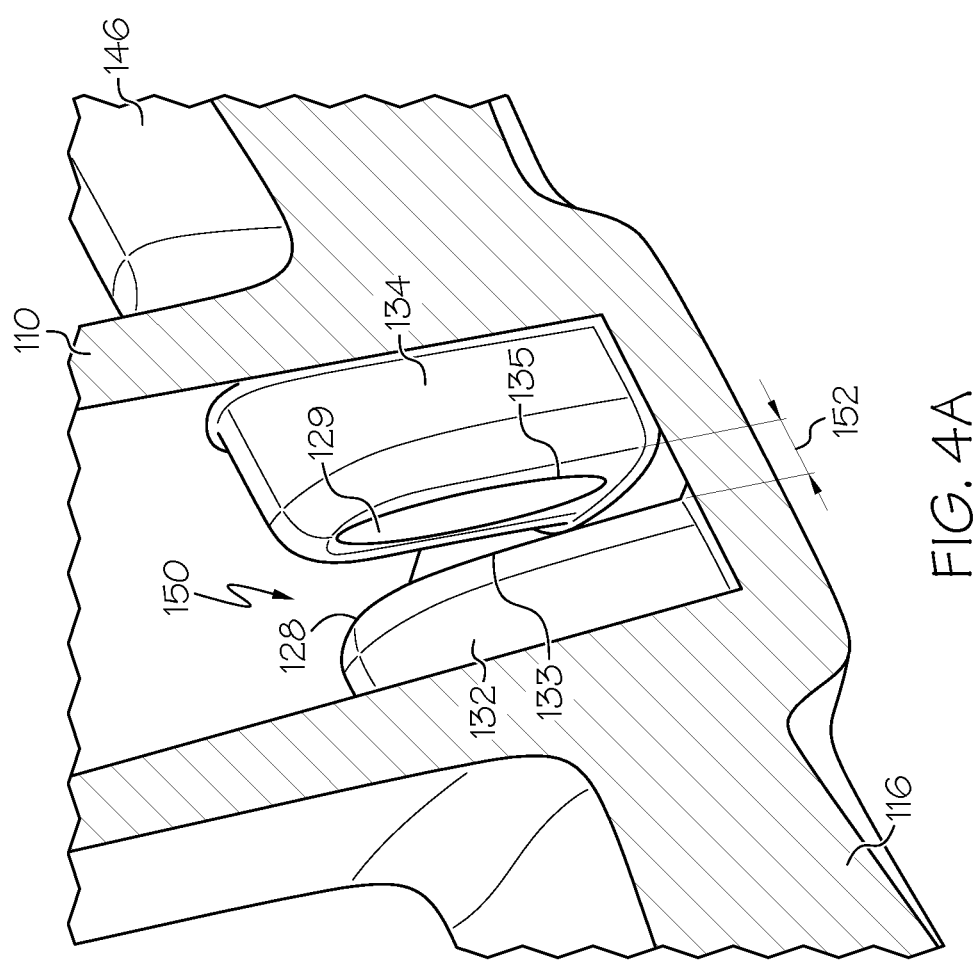

ASPIRATORS FOR PRODUCING VACUUM USING THE VENTURI EFFECT

RELATED APPLICATIONS

This application is a continuation of U.S. application Ser. No. 14/294,727, filed Jun. 3, 2014, which claims the benefit of U.S. Provisional Application No. 61/833,746, filed Jun. 11, 2013.

TECHNICAL FIELD

This application relates to aspirators for producing vacuum using the Venturi effect, more particularly to such aspirators having increased suction flow by increasing the perimeter of the inner passageway at the motive outlet end and the discharge inlet end for a maximum motive flow rate selected by a customer.

BACKGROUND

Engines, for example vehicle engines, are being downsized and boosted, which is reducing the available vacuum from the engine. This vacuum has many potential uses, including use by the vehicle brake booster.

One solution to this vacuum shortfall is to install a vacuum pump. Vacuum pumps, however, have a significant cost and weight penalty to the engine, their electric power consumption can require additional alternator capacity, and their inefficiency can hinder fuel economy improvement actions.

Another solution is aspirators that generate vacuum by creating an engine air flow path that is parallel to the throttle, referred to as an intake leak. This leak flow passes through a Venturi that generates a suction vacuum. The problem with the presently available aspirators is that they are limited in the amount of vacuum mass flow rate they can generate, and by the amount of engine air they consume, for example, aspirators having a circular cross-section at the motive outlet end and the discharge inlet end as shown in FIG. 3 and as disclosed in U.S. Application Publication 2006/0016477 and U.S. Application Publication 2013/0213510.

A need exists for improved designs that generate increased vacuum pressure and increased suction mass flow rate while decreasing the consumption of engine air.

SUMMARY

Aspirators are disclosed herein that generate increased vacuum pressure and increased suction mass flow rates while decreasing the consumption of engine air. Such aspirators include a body defining a Venturi gap between an outlet end of a converging motive section and an inlet end of a diverging discharge section. The converging motive section has an elliptical- or polygonal-shaped internal cross-section motive outlet and the diverging discharge section has an elliptical- or polygonal-shaped internal cross-section discharge inlet, and the converging motive section and the diverging discharge section, together, define an inner passageway formed by hyperboloid curves connecting a motive inlet to the elliptical or polygonal-shaped motive outlet or the elliptical or polygonal-shaped discharge inlet to a discharge outlet. In one embodiment, at least one of the motive inlet or the discharge outlet has a circular internal cross-section.

The aspirators may include a suction port defining a void in fluid communication with the Venturi gap. Here, a first portion of the body that defines the outlet end of the converging motive section and a second portion of the body that defines the inlet end of the diverging discharge section lay on the surface of the void and the void extends downward around the sides of both the first body portion and the second body portion. In one embodiment, the exterior profile of both the first portion and the second portion of the body generally match the internal cross-section of the inlet end and the outlet end, respectively.

In one aspect, the aspirators are constructed with the elliptical- or polygonal-shaped internal cross-section of the outlet end of the converging motive section having a ratio of the major axis to the minor axis of about 2 to about 4, and the elliptical- or polygonal-shaped internal cross-section of the inlet end of the diverging discharge section being offset, relative to the elliptical- or polygonal-shaped internal cross-section of the outlet end of the converging motive section, by the ratio of the difference of the discharge inlet area and the motive outlet area to the peak motive mass flow rate ((discharge inlet area−motive outlet area)/peak motive flow rate) times a constant, where the ratio is greater than 0.28.

In one embodiment, the Venturi gap is proportional to the (motive mass flow rate)$^n$, wherein n is 0.25 to 0.8, and the offset between the motive outlet and the discharge inlet is proportional to the (motive mass flow rate)$^n$, where n is 0.25 to 0.8, and the elliptical- or polygonal-shaped internal cross-section of the outlet end has an eccentricity of between 0 to, and including 1. In one embodiment, n for the Venturi gap and n for the offset may both be 0.4 to 0.6.

BRIEF DESCRIPTION OF THE DRAWINGS

FIG. 4A is a side, cross-sectional perspective view taken along a plane parallel to the central longitudinal axis B at the junction of the suction port in the aspirator of FIG. 2.

FIG. 4B is a representation of the volume of the Venturi gap in FIG. 4A.

DETAILED DESCRIPTION

Figure 1:
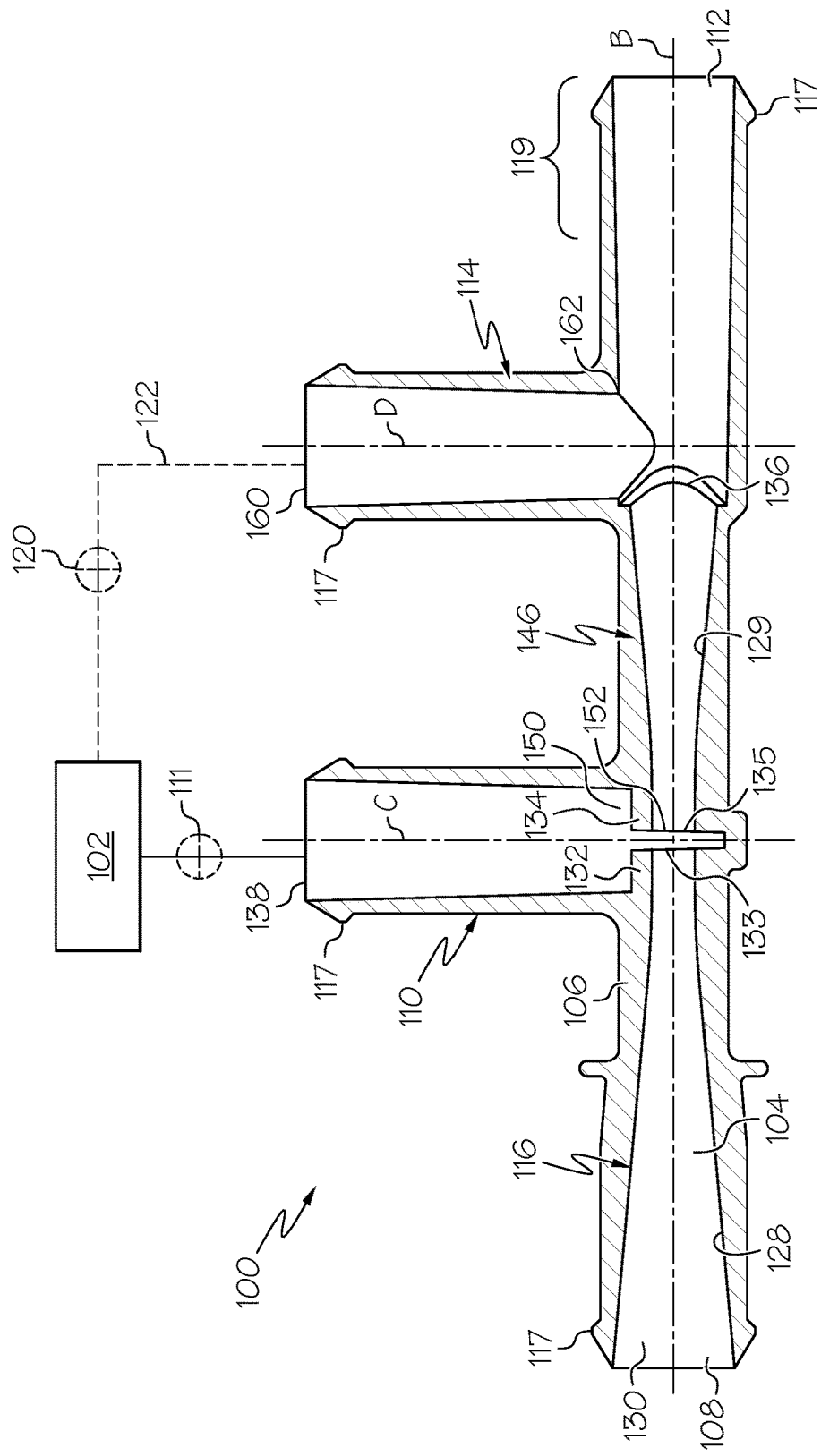
FIG. 1 is a side, longitudinal cross-sectional plan view of one embodiment of an aspirator.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
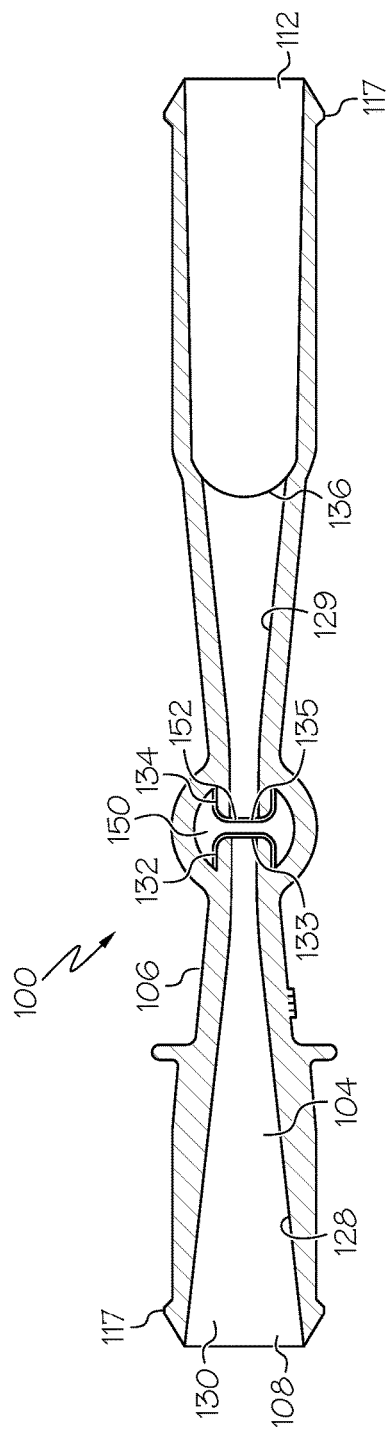
FIG. 2 is a top plan view, in cross-section, of the aspirator of FIG. 1.

FIGS. 1 and 2 illustrate different views of an aspirator 100. The aspirator 100 may be used in an engine, for example, in a vehicle's engine to provide vacuum to a device. In FIG. 1 the aspirator 100 is connected to a device requiring vacuum 102, and the aspirator 100 creates vacuum for said device 102 by the flow of air through a passageway 104, extending generally the length of the aspirator, designed to create the Venturi effect. Aspirator 100 includes a body 106 defining passageway 104 and having three or more ports that are connectable to an engine or components connected thereto. The ports include: (1) a motive port 108, which may be connected to a source of clean air, e.g., from the engine intake air cleaner, that is positioned upstream of a throttle; (2) a suction port 110, which can connect via an optional check valve 111 to the device requiring vacuum 102; (3) an aspirator outlet 112, which is connected to an engine intake manifold downstream of the throttle of the engine; and, optionally, (4) a bypass port 114. Each of the respective ports 108, 110, 112, and 114 may include a connector feature 117 on the outer surface thereof for connecting the respective port to a hose or other component in the engine.

Check valve 111 is preferably arranged to prevent fluid from flowing from the suction port 110 to the application device 102. In one embodiment, the device requiring vacuum 102 is a vehicle brake boost device, positive crankcase ventilation (PCV) device, or fuel purge device. In another embodiment, the device requiring vacuum 102 is a hydraulic valve. The bypass port 114 may be connected to the device requiring vacuum 102 and, optionally, may include a check valve 120 in the fluid flow path 122 therebetween. Check valve 120 is preferably arranged to control the flow of fluid to or from the bypass port 114 to the application device 102.

Figure 3:
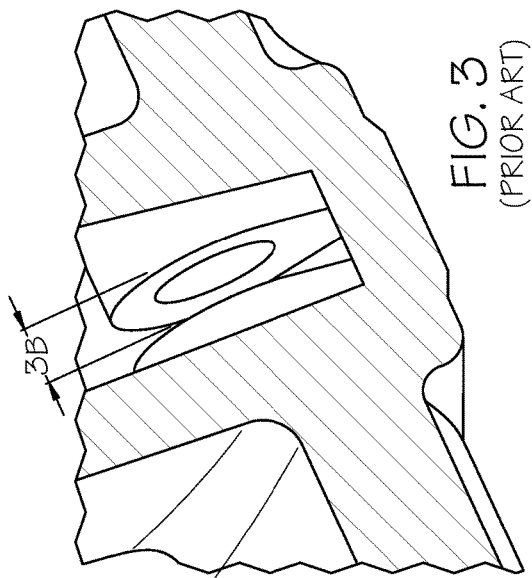
FIG. 3 is a side, cross-sectional perspective view taken along a plane parallel to the central longitudinal axis B at the junction of the suction port in the aspirator in a prior art aspirator having circular transverse cross-sections in the motive section and the discharge section.

Referring now to FIGS. 2 and 3, the aspirator 100 is generally a "T-shaped" aspirator defining an inner passageway along a central longitudinal axis B bisected by the suction port 110. The inner passageway 104 includes a first tapering portion 128 (also referred to herein as the motive cone) in the motive section 116 of the body 106 coupled to a second tapering portion 129 (also referred to herein as the discharge cone) in the discharge section 146 of the body 106. Here, the first tapering portion 128 and the second tapering portion 129 are aligned end to end having the motive outlet end 132 facing the discharge inlet end 134 and defining a Venturi gap 152 therebetween, which defines a fluid junction placing the suction port 110 in fluid communication with both the motive section 116 and the discharge section 146 of the inner passageway 104. The Venturi gap 152 as used herein means the lineal distance between the motive outlet end 132 and the discharge inlet end 134.

When an aspirator, such as aspirator 100, is for use in a vehicle engine, the vehicle manufacturer typically selects the size of both the motive port 108 and aspirator outlet 112 based on the tubing/hose size available for connection of the aspirator to the engine or components thereof. Additionally, the vehicle manufacturer typically selects the maximum motive flow rate available for use in the aspirator, which in turn will dictate the area of the interior opening defined at the motive outlet end 132, i.e., the motive outlet 133. Accordingly, the vehicle manufacturer's selected parameters for the particular engine dictate the ratio of the motive outlet 133 to the aspirator outlet 112. Working within these constraints, the disclosed aspirators 100 significantly reduce the compromise between the desire to produce high suction flow rates at low (5 kPa to 30 kPa) source/discharge pressures and increased depth of vacuum at higher (30 kPa to 60 kPa) source discharge pressures. This reduction in the compromise is accomplished by changing the configuration for the motive outlet 133 and the discharge inlet 135 (defined by the discharge inlet end 134) to increase the perimeter of the inner passageway 104 at the motive outlet end 132 and the discharge inlet end 134, such as presented in FIGS. 5 and 6.

Figure 5B:
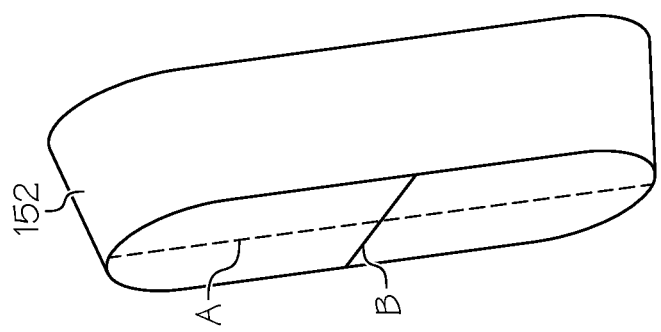
FIG. 5B is a representation of the volume of the Venturi gap in FIG. 5A.
Figure 5A:
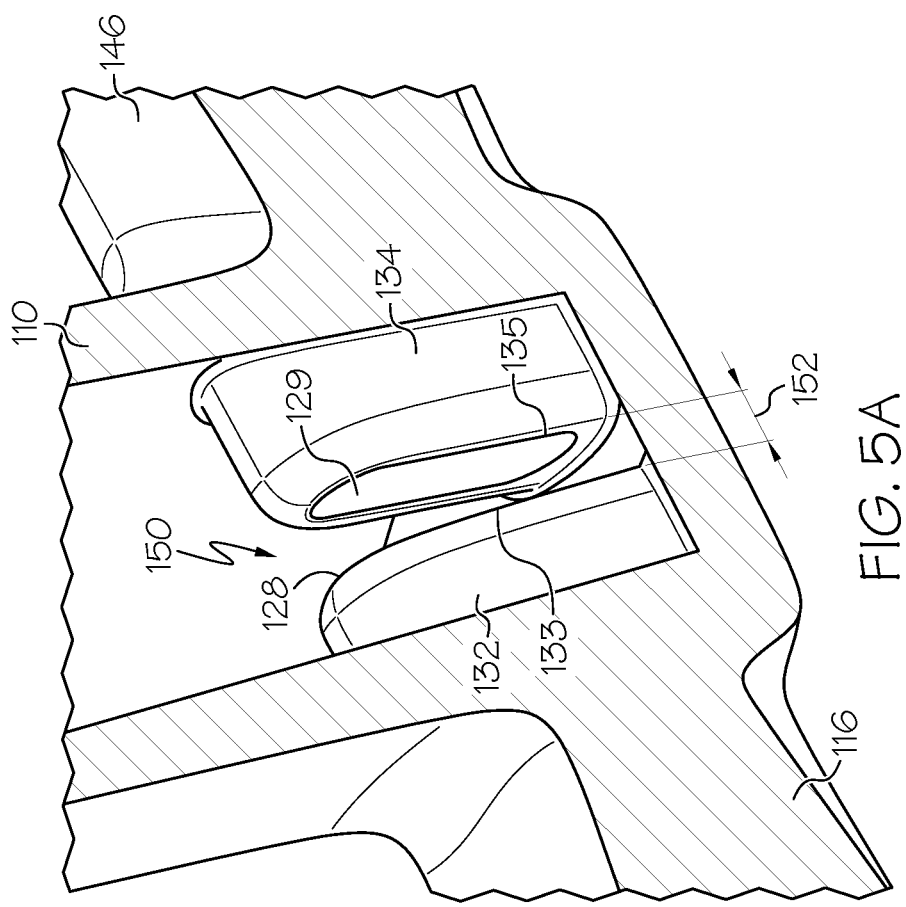
FIG. 5A is a side, cross-sectional perspective view taken along a plane parallel to the central longitudinal axis B at the junction of the suction port in another embodiment of an aspirator.
Figure 6:
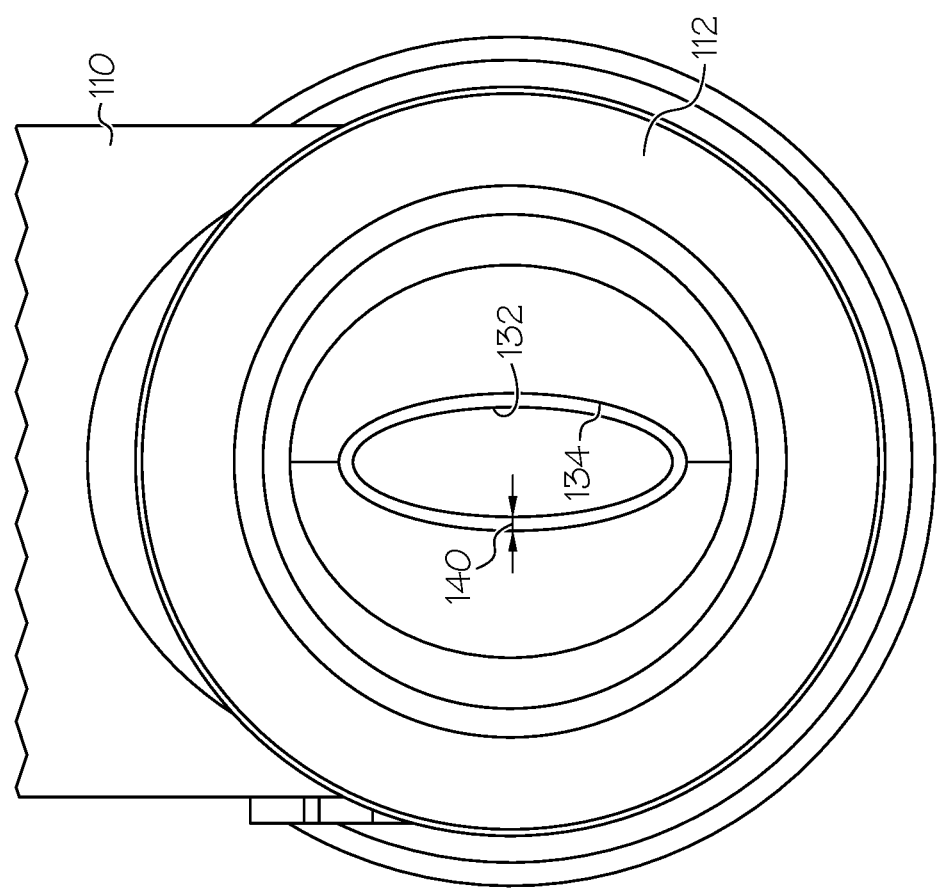
FIG. 6 is a plan view looking into the aspirator from the aspirator outlet showing the offset between the motive outlet end and the discharge inlet end.
Figure 7:
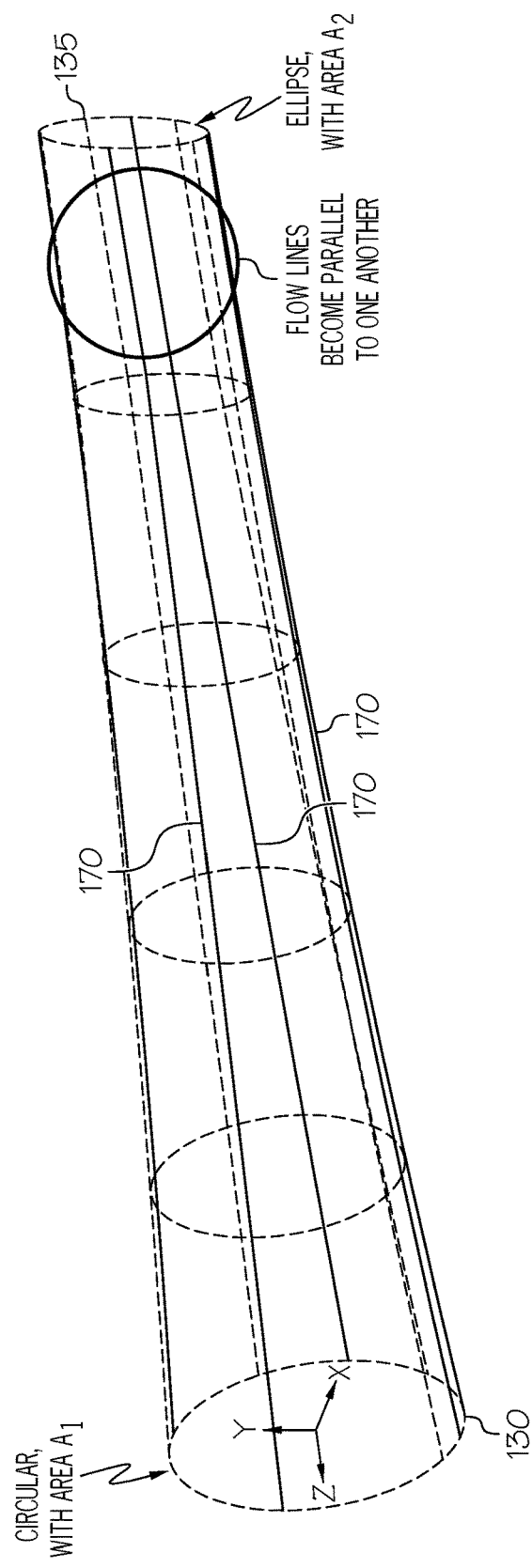
FIG. 7 is a model of the internal passageway within the motive section of the aspirator.

As illustrated in FIGS. 5A-5B and 6, at least the interior surface of the motive outlet end 132 (the motive outlet 135) and the interior surface of the discharge inlet end 134 (the discharge inlet 135) are ellipse-shaped, but may alternately have a polygonal form. The interior of the inner passageway 104 extending away from the motive outlet end 132 and away from the discharge inlet end 134, in opposite directions, from the Venturi gap 152, may be constructed to have the same general shape. FIG. 7 illustrates one embodiment of the shape of the internal passageway within the motive section of the aspirator, but equally, if rotated 180 degrees illustrates the internal passageway within the discharge section. The internal passageway in FIG. 7 begins at the motive inlet end 130 as a circular opening having an area $A_1$ and gradually, continuously transitions, a hyperbolic function, to an ellipse opening at the motive outlet 135 that has an area $A_2$, which is smaller than $A_1$. The circular opening at the motive inlet end 130 is connected to the ellipse-shaped motive outlet 135 by hyperbola lines 170 that provide the advantage of flow lines at the motive outlet end 132 being parallel to one another. The motive inlet end 130 and the discharge outlet end 136 may also define ellipse-shaped or some other polygonal form openings at some point prior thereto and transition from said shapes to a circular cross-section to form a hose connecting portion, for example similar to hose-connecting portion 119, having connector features 117 on the exterior thereof.

To form the "T" shape of the aspirator 100 the suction port 110 has a central longitudinal axis C generally perpendicular to the body's central longitudinal axis B. The optional bypass port 114 may likewise have a central longitudinal axis D that is generally perpendicular to the body's central longitudinal axis B. As illustrated in FIG. 1, the bypass port 114 may intersect the second tapering section 129 adjacent to, but downstream of the discharge outlet end 136. The body 106 may thereafter, i.e., downstream of this intersection of the bypass port, continue with a cylindrically uniform inner diameter until it terminates at the aspirator outlet 112. In another embodiment (not shown), the bypass port 114 and/or the suction port 110, rather than being perpendicular, may be canted relative to axis B and/or to one another. In the embodiment of FIG. 2, the suction port 110 and the bypass port 114 are aligned with one another and have the same orientation relative to the body's central longitudinal axis B. In another embodiment, not shown, the suction port 110 and the bypass port 114 may be offset from one another and can be positioned relative to components within the engine that they will connect to for ease of connection.

The suction port 110 includes a suction inlet 138 and a suction outlet, which is the discharge inlet 134, and similarly to the first tapering section 128, may gradually, continuously taper as a cone or according to a hyperbolic function along its length from the larger dimensioned suction inlet 138 to a smaller dimensioned suction outlet 134. The bypass port 114, when present, may also gradually, continuously taper as a cone or according to a hyperbolic function along its length, in particular from a smaller dimensioned end 162 to a larger dimensioned end 160. Depending upon the attachment of the aspirator into a system, the bypass port 114 may operate with the larger dimensioned end 160 as the inlet and the smaller dimensioned end 162 as the outlet or vice versa.

As best seen in FIGS. 2 and 5, at the motive outlet end 132 of the first tapering portion 128, juxtaposed to the second tapering portion 129, the suction port 110 includes an enlarged region defining a void 150 in fluid communication with Venturi gap 152 or conversely the Venturi gap 152 may be considered part of void 150. The fluid junction of the suction port 110 with inner passageway 104 is generally centered relative to the Venturi gap 152 and the void 150 is generally aligned with the suction port's central longitudinal axis C and transitions the first tapering portion 128 into the second tapering portion 129. The void 150 may be shaped as parallelepiped whose length is similar to the suction port's interior cross-section dimension(s), but whose bottom is an arcuate projection projecting downward away from the suction port 110. In a cross-section taken transverse to the body's central longitudinal axis B along the suction port's central longitudinal axis C, the void is seen to be generally U-shaped around and/or over the discharge inlet end 134 and the motive outlet end 132 as best understood by viewing FIGS. 2, 4A, and 5A in combination. As seen in FIGS. 2 and 5A, the suction port extends downward around the sides of the motive outlet end 132 and the sides of the discharge inlet end 134 and defines the void 150 between all sides thereof. As seen in FIG. 5A, the exterior profile of the motive outlet end 132 and the discharge inlet end 134 both generally match their respective internal shapes.

In aspirator 100, the flow of motive air through the first tapering portion 128 increases its speed, but creates low static pressure in the void 150. This low static pressure draws air from the suction port 110 into the Venturi gap 152 and into the discharge section 146 through the discharge inlet (suction outlet) 134.

The aspirator 100 may be operated to meet the following geometric ratios:

| Representative Symbol | Ratio |
| --- | --- |
| A' | suction inlet area/suction outlet area |
| B' | motive inlet area/motive outlet area |
| C' | discharge outlet area/discharge inlet area |

There are also performance ratios as follows:

| Representative Symbol | Ratio |
| --- | --- |
| F | suction mass flow rate/motive mass flow rate |
| G | suction vacuum pressure/discharge vacuum pressure |

To maximize the ratio F for the hyperbolical flow passageways disclosed herein, the ratio A' should be between 3 and 12, and the ratio B' should be greater than 4, and the ratio C' should be greater than 4.

To maximize the ratio G for hyperbolical flow passageways, the ratio A' should be between 3 and 12, and the ratio B' should be greater than 4, and the ratio C' should be greater than 4.

In the prior art of FIG. 3, the outlet end of the motive cone and the inlet end of the discharge cone each have circular internal cross-sections and circular exterior profiles and thereby define a Venturi gap that is a frustum having a circular outer periphery. From this drawing, one of the limitations to suction flow is illustrated—the area at the fluid junction of the suction port to the motive cone and the discharge cone.

In a desire to increase the flow rate of air from the suction port into the Venturi gap 152 of the aspirators disclosed herein, the area of the Venturi gap is increased by increasing the perimeter of the outlet end 132 and the inlet end 134 without increasing the overall inner dimension of the first tapering section 128 and the second tapering section 129 (preferably with no increase in the mass flow rate). In particular, motive outlet end 132 and discharge inlet end 134 are changed from being circular to being non-circular as described above. There are an infinite number of possible shapes that are not circular, each with a perimeter and a cross sectional area. These include polygons, or straight-line segments connected to each other, non-circular curves, and even fractal curves. To minimize cost a curve is simpler and easy to manufacture and inspect, and has a desirable perimeter length.

FIGS. 4A-AB and 5A-5B illustrate embodiments with improved fluid junctions where the suction port 110 meets the motive outlet end 132 and the discharge inlet end 134. The smallest area of the flow path from the suction port 110 to the Venturi gap 152 is the frustum defined between the motive outlet end 132 and the discharge inlet end 134, see FIGS. 4B and 5B. In FIGS. 4A and 4B, the outlet end 132 of the motive cone 128 and the inlet end 134 of the discharge cone 129 each have inner and outer elliptical perimeters and thereby define a Venturi gap 152 that is a frustum having an elliptical outer periphery. In FIGS. 5A and 5B, the outlet end 132 of the motive cone 128 and the inlet end 134 of the discharge cone 129 each have inner and outer generally rectangular-shaped perimeters (with rounded corners) and thereby define a Venturi gap 152 that is a frustum having a generally rectangular-shaped outer periphery. While the embodiments in the figures have the same perimeter for the outlet end 132 and the inlet end 134, i.e., both are elliptical or both are generally rectangular, the outlet end 132 and the inlet end 134 may have differently shaped perimeters, i.e., one may be elliptical while the other is generally rectangular. Additionally, the motive outlet end 132 and the discharge inlet end 134 may terminate with a rounded chamfer to improve the directionality of the flow of the fluid from the suction port 110 in to the discharge inlet end 134.

Additionally, as seen most clearly in FIG. 6, but is also seen in the frustums of FIGS. 4B and 5B, the outlet end 132 of the motive cone 128 for each embodiment is dimensionally smaller than the inlet end 134 of the discharge cone 129. This difference in dimension is identified as offset 140. In FIG. 4B, for example, the offset is seen in that the length of the major axis Y of the motive outlet end 132 is less than the length of the major axis Y' of the discharge inlet end 134 and may also have a length of the minor axis X of the motive outlet end 132 that is less than the length of the minor axis X' of the discharge inlet end 134.

In any of the elliptical- or polygonal-shaped embodiments, the elliptical- or polygonal-shaped internal cross-section of the motive outlet end of the converging motive section has a ratio of the major axis to the minor axis of about 2 to about 4, and the elliptical- or polygonal-shaped internal cross-section of the inlet end of the diverging discharge section is offset, relative to the elliptical- or polygonal-shaped internal cross-section of the outlet end of the converging motive section, by the ratio of the difference of the discharge inlet area and the motive outlet area to the peak motive flow rate, which is then multiplied by a constant $k_1$ to have a unitless ratio of greater than 0.28.

$$\text{Offset ratio} = (\text{discharge inlet area} - \text{motive outlet area})/\text{peak motive flow rate} * k_1 \quad (V)$$

where $k_1$ is:

$$k_1 = c \text{ at the motive outlet end} * D_{fluid} \text{ at the motive outlet end}; \quad (VI)$$

and c is the speed of sound and $D_{fluid}$ is the density of the fluid (typically air).

In any of the elliptical- or polygonal-shaped embodiments, the Venturi gap between the motive outlet end and the discharge inlet end has a gap ratio defined as the area of the Venturi gap divided by the motive flow times a constant $k_2$ (to have a unitless ratio).

$$\text{gap ratio} = \text{area of the Venturi gap}/\text{motive flow rate} * k_2 \quad (VII)$$

where $k_2$ is:

$$k_2 = c \text{ at the motive outlet end} * D_{fluid} \text{ at the motive outlet end}; \quad (VIII)$$

and c and $D_{fluid}$ are as defined above. Here, the gap ratio is greater than 4.7.

In one embodiment, the elliptical- or polygonal-shaped internal cross-section of the motive outlet end 132 has an eccentricity of between 0 to, and including 1. In another embodiment, the elliptical- or polygonal-shaped internal cross-section of the outlet end has an eccentricity of between about 0.4 to, and including about 0.97.

Referring again to FIGS. 4A and 4B, the outlet end 132 and the inlet end 134 are elliptical in profile thereby having a major axis (Y) and a minor axis (X). The equation of an ellipse can be defined as; $X^2/B^2 + Y^2/A^2 = 1^2$. Where A is the distance from the origin to the ellipse along the major axis Y and B is the distance from the origin to the ellipse along the minor axis X. The area of an ellipse is:

$$\text{Area of an ellipse} = \pi \times A \times B. \quad (I)$$

The perimeter of an ellipse is not given by a simple exact equation. Instead a series equation provides an acceptable approximation;

$$\text{Perimeter of an ellipse} = \pi \times (A+B) \times (1 + h^2/4 + h^4/64 + h^6/256 \ldots) \quad (II)$$

where h is:

$$\text{Variable } h = (A-B)/(A+B). \quad (III)$$

We can further define a term, eccentricity, which is a term that relates the length of the two axes. It is defined as:

$$\text{Variable } e = (A^2 - B^2)^{1/2}/A. \quad (IV)$$

Given a selected motive flow for the aspirator design being chosen to be equivalent for calculations where the radius of the prior art circular aspirator is 1 mm, the area is of 3.14 mm² with a perimeter of 6.28 mm. The ratio of perimeter to area is mathematically equal to 2 for a circular internal cross-section for the motive outlet end and the discharge inlet end.

For an ellipse of a given eccentricity we can compute the area, perimeter and the ratio of perimeter to cross sectional area in the disclosed embodiments. If we limit the area to be equal to that of a circle of radius of 1 mm, the calculated results are as follows;

TABLE 1 ellipse

| e | A (mm) | B (mm) | h | area (mm²) | perimeter (mm) | ratio perimeter to area (mm⁻¹) |
|---|---|---|---|---|---|---|
| 0.000 | 1.000 | 1.000 | 0.000 | 3.142 | 6.283 | 2.000 |
| 0.431 | 1.053 | 0.950 | 0.051 | 3.143 | 6.297 | 2.004 |
| 0.586 | 1.111 | 0.900 | 0.105 | 3.141 | 6.335 | 2.017 |
| 0.691 | 1.176 | 0.850 | 0.161 | 3.140 | 6.406 | 2.040 |
| 0.768 | 1.250 | 0.800 | 0.220 | 3.142 | 6.518 | 2.075 |
| 0.827 | 1.333 | 0.750 | 0.280 | 3.141 | 6.673 | 2.125 |
| 0.872 | 1.429 | 0.700 | 0.342 | 3.143 | 6.886 | 2.191 |
| 0.906 | 1.538 | 0.650 | 0.406 | 3.141 | 7.160 | 2.280 |
| 0.933 | 1.667 | 0.600 | 0.471 | 3.142 | 7.522 | 2.394 |
| 0.953 | 1.818 | 0.550 | 0.535 | 3.141 | 7.983 | 2.541 |
| 0.968 | 2.000 | 0.500 | 0.600 | 3.142 | 8.578 | 2.731 |
| 0.979 | 2.222 | 0.450 | 0.663 | 3.141 | 9.345 | 2.975 |
| 0.987 | 2.500 | 0.400 | 0.724 | 3.142 | 10.349 | 3.294 |
| 0.992 | 2.857 | 0.350 | 0.782 | 3.141 | 11.682 | 3.719 |
| 0.996 | 3.333 | 0.300 | 0.835 | 3.141 | 13.504 | 4.299 |
| 0.998 | 4.000 | 0.250 | 0.882 | 3.142 | 16.102 | 5.125 |
| 0.999 | 5.000 | 0.200 | 0.923 | 3.142 | 20.041 | 6.379 |
| 1.000 | 6.667 | 0.150 | 0.956 | 3.142 | 26.653 | 8.483 |
| 1.000 | 10.000 | 0.100 | 0.980 | 3.142 | 39.919 | 12.707 |
| 1.000 | 20.000 | 0.050 | 0.995 | 3.142 | 79.783 | 25.396 |

So, by changing the eccentricity, the perimeter can be increased while holding the cross sectional area fixed. This increase in perimeter provides the advantage of increasing the intersection area at the junction between the suction port, the motive cone, and the discharge cone, resulting in an increase in the suction port flow rate.

Referring now to FIGS. 5A and 5B, the motive outlet end 132 and the discharge inlet end 134 are generally rectangular in profile thereby having a length and a width and hence two axes, a major axis A and a minor axis B. As illustrated, the aspirator's generally rectangular profile for the outlet end 132 and inlet end 134 include semicircular ends corresponding to the width of the rectangular portion. The orientation of the profile of the outlet and inlet ends 132, 134 should not be construed to be limited thereto. The area of this rectangle is equal to the sum of the areas of the two end semicircles plus the area of the straight section in between the semicircles. The perimeter of the rectangle is the lengths of the two sides plus the lengths of the semicircular ends. We can calculate the following;

TABLE 2

Rectangle

| A (mm) | B (mm) | area (mm²) | perimeter (mm) | ratio of perimeter to area (mm⁻¹) |
|---|---|---|---|---|
| 1.000 | 1.000 | 3.142 | 6.283 | 2.000 |
| 1.272 | 0.950 | 3.142 | 6.614 | 2.105 |
| 1.563 | 0.900 | 3.142 | 6.981 | 2.222 |
| 1.876 | 0.850 | 3.142 | 7.392 | 2.353 |
| 2.214 | 0.800 | 3.142 | 7.854 | 2.500 |
| 2.583 | 0.750 | 3.142 | 8.378 | 2.667 |
| 2.989 | 0.700 | 3.142 | 8.976 | 2.857 |
| 3.441 | 0.650 | 3.142 | 9.666 | 3.077 |
| 3.951 | 0.600 | 3.142 | 10.472 | 3.333 |
| 4.534 | 0.550 | 3.142 | 11.424 | 3.636 |
| 5.212 | 0.500 | 3.142 | 12.566 | 4.000 |
| 6.018 | 0.450 | 3.142 | 13.963 | 4.444 |
| 6.997 | 0.400 | 3.142 | 15.708 | 5.000 |
| 8.226 | 0.350 | 3.142 | 17.952 | 5.714 |

TABLE 2-continued

Rectangle

| A (mm) | B (mm) | area (mm$^2$) | perimeter (mm) | ratio of perimeter to area (mm$^{-1}$) |
|---|---|---|---|---|
| 9.829 | 0.300 | 3.142 | 20.944 | 6.667 |
| 12.031 | 0.250 | 3.142 | 25.133 | 8.000 |
| 15.280 | 0.200 | 3.142 | 31.416 | 10.000 |
| 20.623 | 0.150 | 3.142 | 41.888 | 13.333 |
| 31.202 | 0.100 | 3.142 | 62.832 | 20.000 |
| 62.725 | 0.050 | 3.142 | 125.664 | 40.000 |

Changing from a circular cross section to a generally rectangular one with the same area results in an increase in the ratio of perimeter to area similarly to the elliptical profile described above. This increase in perimeter will again provide the advantage of increasing the intersection area between the Venturi gap and the suction port, resulting in an increase in suction port flow.

Another way to increase suction flow would be to lengthen the distance between the outlet end 132 of the motive cone 128 and the inlet end 134 of the discharge cone 129. As the motive flow travels through the Venturi gap it mixes with suction air. This combined flow has the effect of increasing the static pressure towards the discharge end of the Venturi. Lengthening this distance offers diminishing returns, and because the motive flow is largely unconstrained in the Venturi, offers the risk of turbulence and flow disturbance, which would reduce the velocity and increase static pressure. Accordingly, the increase in perimeter described above is preferred over lengthening the distance, but the two could be combined to avoid the diminishing returns.

The aspirators disclosed herein may be molded as a monolithic body. In one embodiment, the aspirators are formed by injection molding.

In one embodiment, the Venturi gap 152 is a lineal distance proportional to the (motive mass flow rate)$^n$, wherein n is 0.25 to 0.8, and the offset between the motive outlet and the discharge inlet is also proportional to the (motive mass flow rate)$^n$, where n is 0.25 to 0.8, and the elliptical- or polygonal-shaped internal cross-section of the outlet end has an eccentricity of between 0 to, and including 1, or more preferably between about 0.4 to, and including about 0.97. When the aspirator is included in a system having a device requiring higher amounts of vacuum, n for the Venturi gap and n for the offset may both be 0.4 to 0.6. In one embodiment, n for the Venturi gap and n for the offset are both 0.5 and the eccentricity is between about 0.4 to, and including 0.97.

In operation, for example when the aspirator is connected into an engine, engine air, i.e. filtered air, can be connected to enter the aspirator at the motive port. Air exiting the aspirator at the discharge port can be connected to the engine air at a point where the pressure is lower than that of the motive port. The motion of the air from the motive to discharge port draws the air down the motive cone, which can be a straight cone or a hyperbolic profile as described above. The reduction in area causes the velocity of the air to increase. Because this is an enclosed space the laws of fluid mechanics state that the static pressure must decrease when the fluid velocity increases. The minimum cross-sectional area of the motive cone abuts the Venturi gap. As air continues to travel to the discharge port it travels through the discharge cone, which is either a straight cone or a hyperbolic profile. Optionally, the discharge region can continue as a straight or hyperbolic profile cone until it joins the discharge port, or it can transition to a simple cylindrical or tapered passage. The minimum cross-sectional area end of the discharge cone is larger than that of the minimum cross section area end of the motive cone. The larger area is to provide area for the flow of air from the suction port. This change in area down the discharge cone slows the air velocity down again, with a subsequent increase in its static pressure.

The Venturi gap connects to the suction port, which exposes air in the suction port/passage to the same low static pressure that exists in the air passing at high velocity between the motive and discharge cones. The pressure created here can be lower than the pressure at the discharge port, which is known already to be lower than that at the motive port. This low pressure may be used for a variety of applications on a vehicle, such as for evacuating a vehicle brake boost canister, as is known to those skilled in the art. Under some circumstances, primarily when the gasoline engine is lightly loaded, the pressure at the discharge port is low enough to quickly lower the pressure at the application device. Since the area of the connection between the discharge cone or passage and the bypass passage is quite large relative to the connection between the suction passage and the Venturi gap, this optional connection can assist in evacuation of the application device initially.

For a comparison study a 3 gps aspirator having an elliptical motive outlet and an elliptical discharge inlet at the Venturi gap and a hyperboloid internal profile in the motive and discharge sections, (referred to as the "hyperboloid ellipse aspirator") as illustrated in FIG. 7, was operated under conditions of 10 kPa manifold vacuum, 15 kPa manifold vacuum, and 20 kPa manifold vacuum with increasing brake boost canister vacuum and compared to a 3 gps conical circular aspirator under the same conditions. A conical circular aspirator is one that has a circular motive outlet and a circular discharge inlet and a conical internal profile in the motive and discharge sections. As evidenced by the data presented in FIG. 8, the hyperboloid ellipse aspirator provided a synergistic effect of the hyperboloid internal profile with the ellipse-shaped openings that exceeded the results of the conical circular aspirator. At 10 kPa, 15 kPa, and 20 kPa manifold pressure, the hyperboloid ellipse aspirator provided higher suction flow rates over an increasing range of brake boost canister vacuum from 12 kPa to about 67 kPa. Interestingly, at 15 kPa manifold pressure the hyperboloid ellipse aspirator performed generally similar to the conical circular aspirator when it was at 20 kPa manifold pressure, evidencing unexpected, superior performance.

Figure 8:
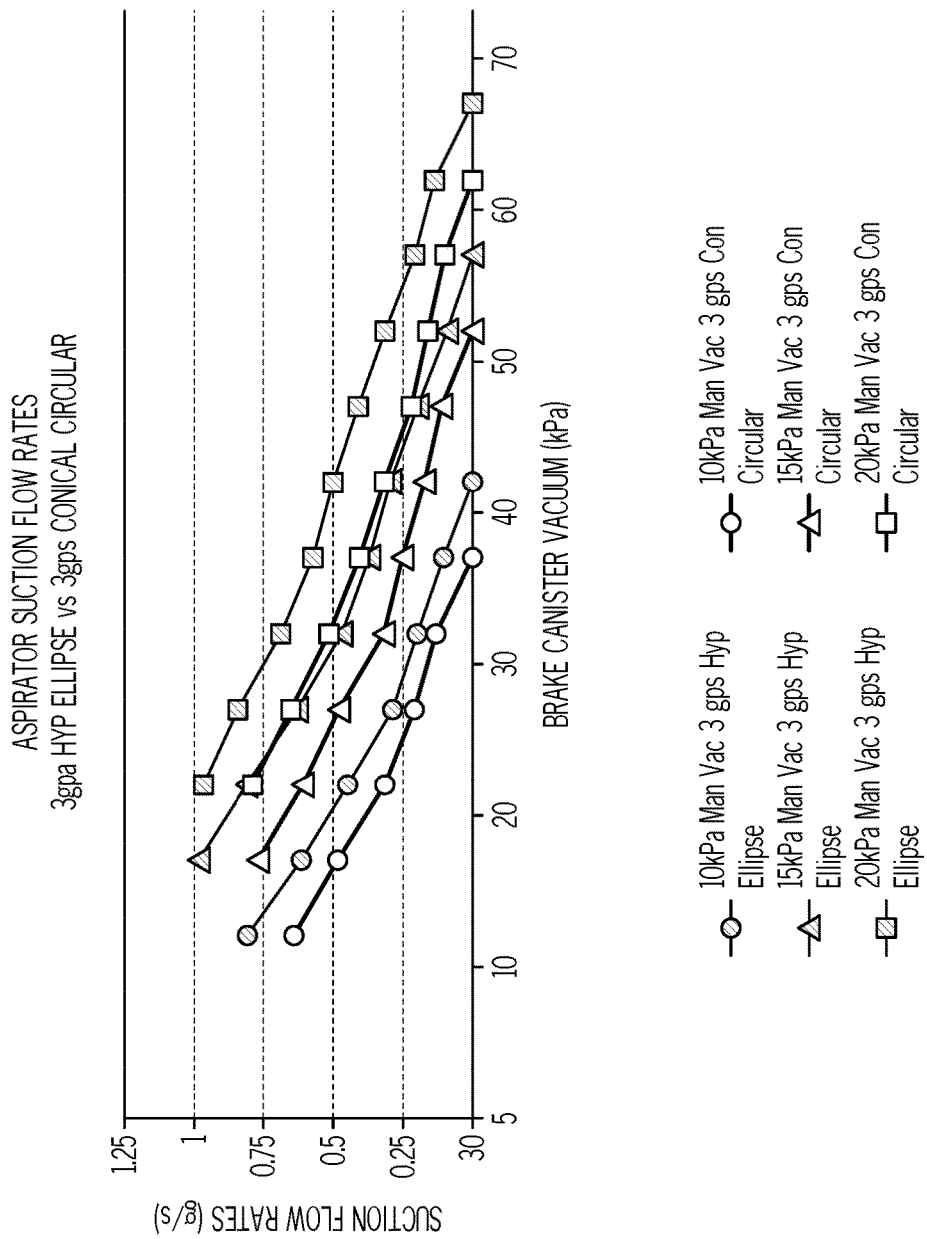
FIG. 8 is a graphical representation comparing the aspirator suction flow rates of a hyperboloid ellipse aspirator disclosed herein against a conical circular aspirator (prior art) at different selected manifold vacuum values.
Figure 9:
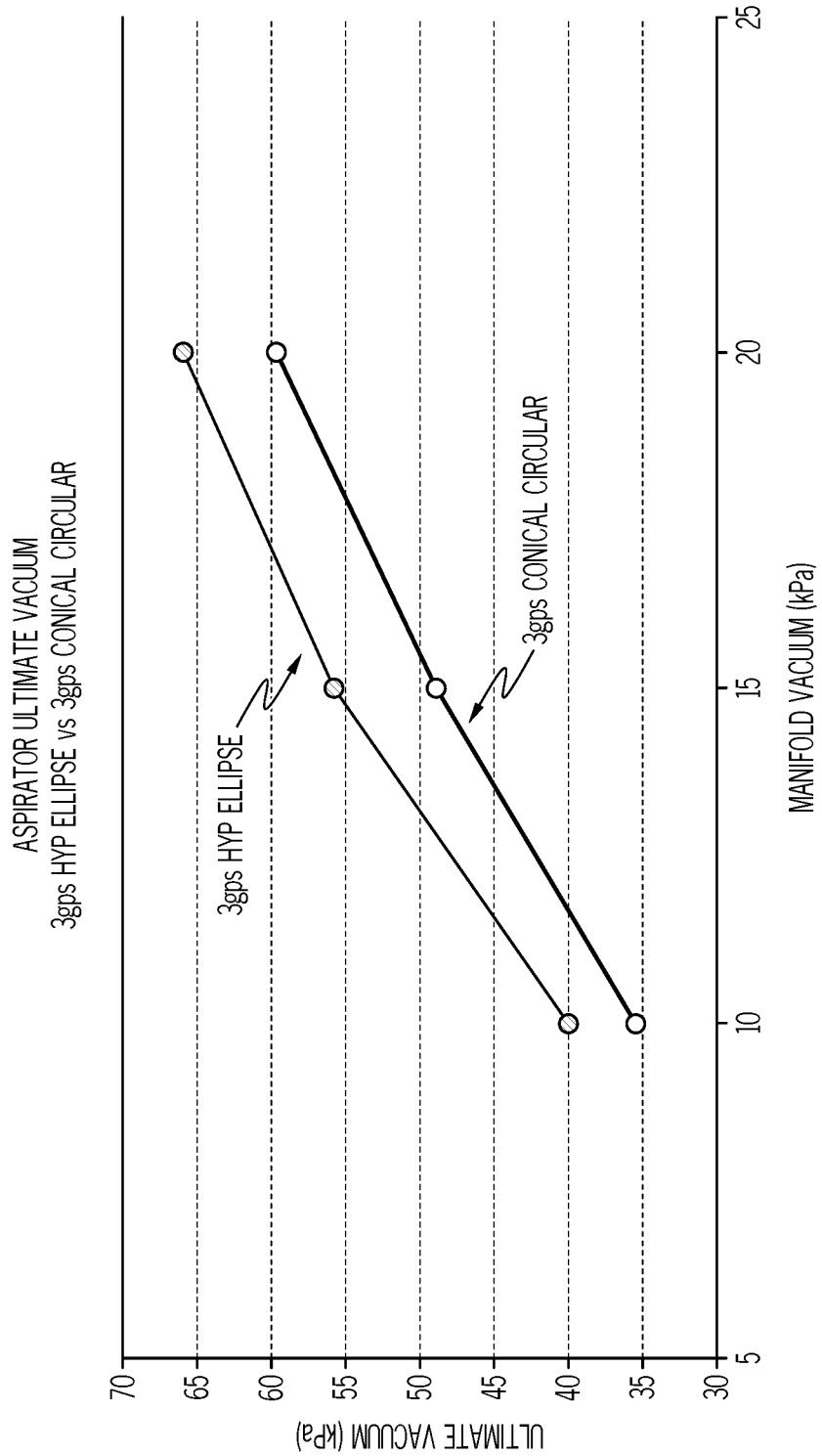
FIG. 9 is a graphical representation comparing the aspirator vacuum of a hyperboloid ellipse aspirator disclosed herein against a conical circular aspirator (prior art) as the manifold vacuum increases.
Figure 10:
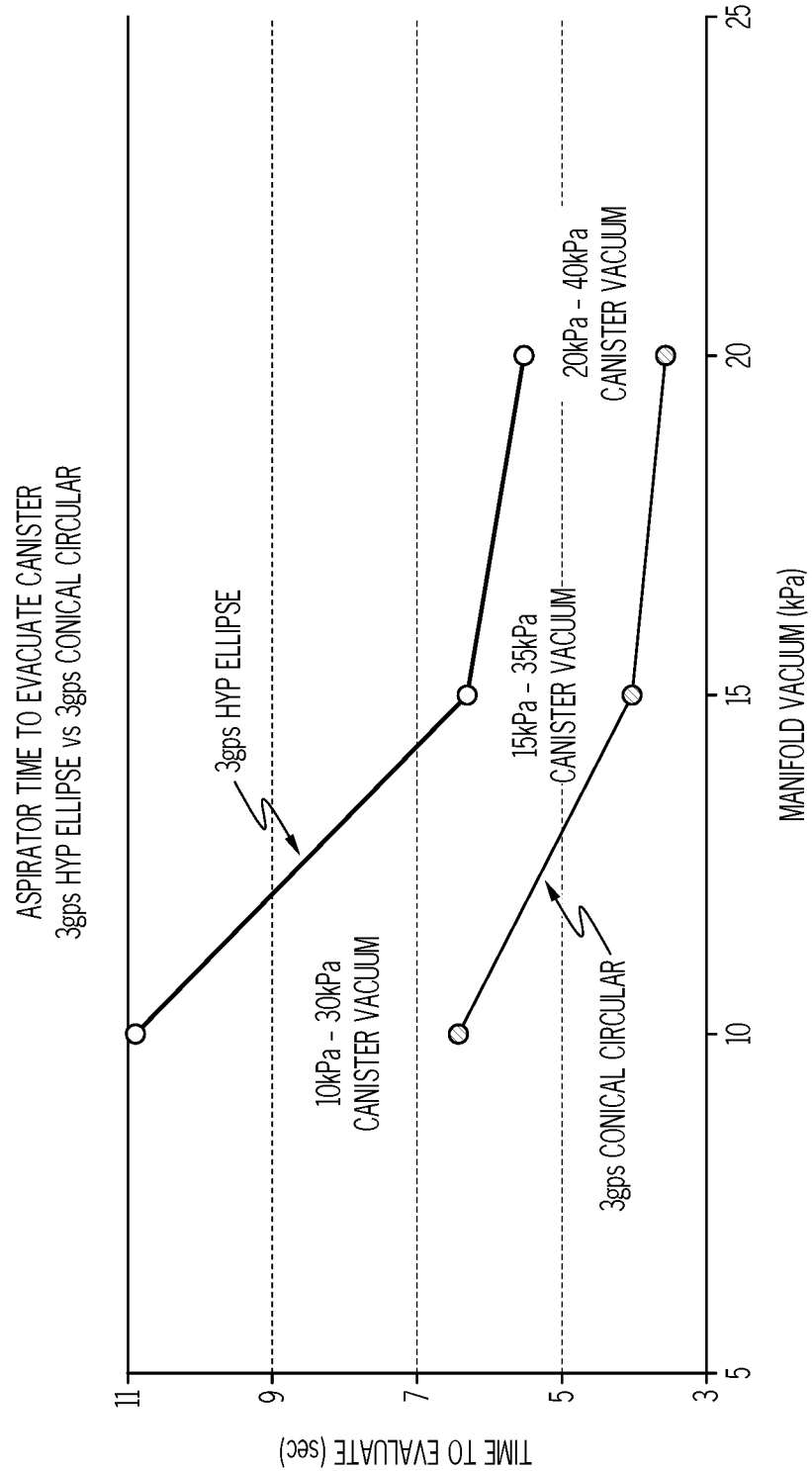
FIG. 10 is a graphical representation comparing the time to evacuate a canister by a hyperboloid ellipse aspirator disclosed herein against a conical circular aspirator (prior art) as the manifold vacuum increases.

Referring now to FIGS. 9 and 10, the same aspirators compared for FIG. 8 were compared with respect to the ultimate vacuum the aspirator could generate and the time needed for the aspirator to evacuate a canister to create vacuum. For the tests, the aspirator outlet 112 was in fluid communication with an intake manifold of the engine, the suction port was in fluid communication with a vehicle brake boost canister, and the motive inlet was connected to a source of clean air. As shown in the graph of FIG. 9, the hyperboloid ellipse aspirator disclosed herein provides a deeper vacuum compared to the conical circular aspirator under the same operating conditions, i.e., at 10, 15, and 20 kPA of manifold vacuum the hyperboloid ellipse aspirator had an ultimate vacuum that was greater by at least 5 kPa. Additionally, as seen in FIG. 10, the hyperboloid ellipse aspirator was superior in evacuating a brake boost canister compared to the conical circular aspirator. At a manifold vacuum pressure of 10 kPa, the hyperboloid ellipse aspirator was just under 4.5 seconds faster at evacuating the canister. At 15 kPa and 20 kPa of manifold vacuum the hyperboloid ellipse aspirator was about 2 seconds faster. Faster evacuation times at lower manifold vacuum provides for faster reaction time and improved performance. But, as seen in these graphs, not only does the aspirator with the hyperboloid elliptical profile have faster evacuation time, it also provides a deeper vacuum at manifold vacuums of 10, 15, and 20 kPa. This dual benefit was a surprising, unexpected result from changing the shapes of the motive outlet and the discharge inlet that defines the Venturi gap and using an internal passageway that changes/taper according to a hyperbolic function.

One advantage of the aspirators disclosed herein is that a decreased amount of engine air is consumed/needed to generate the vacuum necessary to run a device requiring vacuum, which improves engine performance compared to that obtained with a vacuum pump or an aspirator with an internal circular profile.

Although the invention is shown and described with respect to certain embodiments, it is obvious that modifications will occur to those skilled in the art upon reading and understanding the specification, and the present invention includes all such modifications.

What is claimed is:

1. A Venturi device for producing vacuum from fluids in an engine system comprising:
    a body defining a Venturi gap separating apart an outlet end of a converging motive section and an inlet end of a diverging discharge section by a lineal distance, wherein the converging motive section defines an inner passageway that tapers as a hyperbolic function from a circular-shaped motive inlet to an elliptical- or polygonal-shaped motive outlet and the diverging discharge section gradually, continuously tapers toward the Venturi gap; and
    a suction port in fluid communication with the Venturi gap;
    wherein the diverging discharge section defines an elliptical- or polygonal-shaped discharge inlet;
    wherein the hyperbolic function provides flow lines at the motive outlet end being parallel to one another.

2. The Venturi device of claim 1, wherein the diverging discharge section further defines a circular-shaped discharge outlet.

3. The Venturi device of claim 1, wherein the suction port extends downward around the sides of the outlet end of the converging motive section and the sides of the inlet end of the diverging discharge section and defines a void between all sides thereof; and wherein the exterior profile of the outlet end of the converging motive section and the inlet end of the diverging discharge section generally match their respective internal shapes.

4. The Venturi device of claim 3, wherein the inlet end of the diverging discharge section terminates with a rounded chamfer directing fluid flow into the elliptical- or polygonal-shaped discharge inlet.

5. The Venturi device of claim 1, wherein the elliptical- or polygonal-shaped motive outlet has an eccentricity of 0.4 to 0.97.

6. The Venturi device of claim 1, wherein the elliptical- or polygonal-shaped motive outlet has a ratio of a major axis to a minor axis of 2 to 4, and the elliptical- or polygonal-shaped discharge inlet is offset, relative to the elliptical- or polygonal-shaped motive outlet, by the ratio of the difference of the discharge inlet area and the motive outlet area to the peak motive flow rate ((discharge inlet area motive outlet area)/peak motive flow rate) times a constant is greater than 0.28, wherein the constant is equal to the speed of sound times the density of the fluid at the motive outlet.

7. The Venturi device of claim 1, wherein the lineal distance is proportional to the (motive mass flow rate)$^n$, wherein n is 0.25 to 0.8.

8. The Venturi device of claim 1, wherein the lineal distance is proportional to the (motive mass flow rate)$^n$, wherein n is 0.4 to 0.6.

9. The Venturi device of claim 8, wherein the elliptical- or polygonal-shaped motive outlet has an eccentricity of between 0 to, and including 1.

10. The Venturi device of claim 1, wherein an offset, a discharge inlet area minus the motive outlet area, is proportional to the (motive mass flow rate)$^n$, wherein n is 0.25 to 0.8.

11. The Venturi device of claim 1, wherein an offset, a discharge inlet area minus the motive outlet area, is proportional to the (motive mass flow rate)$^n$, wherein n is 0.4 to 0.6.

12. The Venturi device of claim 1, wherein a ratio of suction inlet area/suction outlet area is between 3 and 12, the ratio of motive inlet area/motive outlet area is greater than 4, and a ratio of discharge outlet area/discharge inlet area is greater than 4.

13. The Venturi device of claim 1, wherein the body further comprises a bypass port intersecting the diverging discharge section downstream of the discharge inlet.

14. An engine system comprising:
    a source of fluid pressure;
    a device requiring vacuum;
    an engine and an engine component; and
    a Venturi device according to claim 1;
    wherein the Venturi device has the suction port in fluid communication with the device requiring vacuum, the motive inlet in fluid communication with the source of fluid pressure, and a discharge outlet in fluid communication with the engine or the engine component.

15. The engine system of claim 14, wherein the device requiring vacuum is a brake boost device, positive crankcase ventilation device, or fuel purge device.

16. The engine system of claim 14, wherein the source of fluid pressure is in a range of 5 kPa to 60 kPa.

* * * * *